United States Patent Office 3,513,237
Patented May 19, 1970

3,513,237
PESTICIDAL 2-TRIHALOMETHYLBENZO-
THIAZOLES
David T. Manning, South Charleston, W. Va., and
Anthony A. Sousa, Raleigh, N.C., assignors to
Union Carbide Corporation, a corporation of New
York
No Drawing. Original application Feb. 8, 1965, Ser. No.
431,198. Divided and this application Mar. 28, 1967,
Ser. No. 626,405
Int. Cl. A01n 9/12, 9/20
U.S. Cl. 424—270   13 Claims

ABSTRACT OF THE DISCLOSURE

A method of combatting plant pests by using a pesticidal amount of a 2-trihalomethylbenzothiazole of the formula:

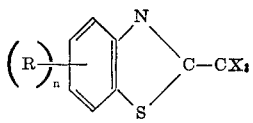

wherein R is selected from the group consisting of hydrogen, halogen, nitro, trihalomethyl and alkyl having from one to twelve carbon atoms; X is halogen, wherein the halogen molecules are the same or different; and $n$ is an integer from 0 to 4 inclusive, is disclosed.

---

This is a division of application Ser. No. 431,198, filed Feb. 8, 1965, now abandoned.

This invention relates to novel 2-trihalomethylbenzothiazoles, and to novel methods for their preparation. In a particular aspect, this invention is concerned with pesticidally-active 2-trihalomethylbenzothiazoles, to compositions containing them and to their use, and to novel methods for their preparation from the corresponding 2-trichloromethylbenzothiazolines and 2-dihalomethylbenzothiazoles.

Y. Mizuno et al. J. Pharm. Soc. Japan, vol. 72, 1263 (1952) report work on the chlorination of 2-methylbenzothiazole to 2-trichloromethylbenzothiazole, and 2-methyl-6-nitrobenzothiazole to 2 - trichloromethyl - 6 - nitrobenzothiazole. The reported Mizuno et al. process uses very strong chlorination procedures employing different reactants, different conditions, and different starting materials from those employed herein. The chlorination process disclosed herein employs mild chlorination procedures under conditions in which nuclear rather than the resultant side-chain chlorination would be the expected reaction. The Mizuno et al. compounds were prepared solely as intermediates for chloramphenicol-like end products to be tested as chemotherapeutic agents. There was no indication by Mizuno et al. that the compounds prepared by them had any usefulness per se other than as intermediates for the chloramphenicol-like end products. The Mizuno et al. intermediates were not considered for possible biological activity by Mizuno et al.

Accordingly, an object of this invention is to provide new and useful 2-trihalomethylbenzothiazoles. Another object is to provide useful 2-trihalomethylbenzothiazoles which find, as a class, particular application in combatting agricultural pests, such as nematodes, mites, fungi, and bateria. A still further specific object is to provide 2-trichloromethylbenzothiazoles which possess activity against pests which adversely affect plant life. Another object is to provide nematocidally-active 2-trichloromethylbenzothiazoles. A still further object is to provide a novel permanganate oxidation process for the preparation of 2-trichloromethylbenzothiazoles from their corresponding 2-trichloromethylbenzothiazolines. Another object is to provide a novel mild halogenation process for the preparation of 2-trihalomethylbenzothiazoles from their corresponding 2-dihalomethylbenzothiazoles. A further object is to provide a method for combatting pests which adversely affect plant life. A still further object is to provide pesticidal compositions containing the 2-trihalomethylbenzothiazoles disclosed herein. These and other objects of this invention will readily become apparent to those skilled in the art to which this invention pertains from the ensuing description thereof.

The 2-trihalomethylbenzothiazoles of this invention can be represented by Formula I.

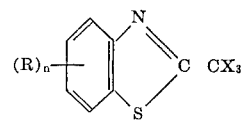

wherein R can be hydrogen, halogen, nitro, trihalomethyl, alkyl, alkenyl, alkoxy, aryloxy, alkylthio, arylthio, cyano, hydroxy, mercapto, carboxy, carbamoyl, N-alkylcarbamoyl, N-arylcarbamoyl, thiocarbamoyl, amino, alkylamino, arylamino, acylamido, aroylamido, acyloxy, aroyloxy, alkoxycarbonyl, aryloxycarbonyl, alkylthiocarbonyl, arylthiocarbonyl, alkoxysulfinyl, aryloxysulfinyl, alkylsulfonyl, arylsulfonyl, acyl, sulfo, sulfamyl, aryl, aroyl, and one fused benzene ring; X is halogen; and $n$ is an integer of from 0 to 4, inclusive, with the proviso that when $X_3$ is $Cl_3$, that at least one R is other than hydrogen or nitro.

It can be seen from Formula I that two classes of structural modifications can be made in the 2-trihalomethylbenzothiazoles of this invention: (1) in the 2-trihalomethyl group —$CX_3$, and (2) in the benzene ring portion

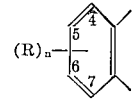

The 2-trihalomethyl group can be —$CCl_3$, —$CBr_3$, or —$CF_3$, as well as various combinations and permutations of these halogens such as —$CCl_2Br$, $CClBr_2$, $CBrF_2$, and so forth. Substitution on the benzene ring portion can occur at one, none, or all of the positions 4, 5, 6, and 7. When one benzene ring is fused to the benzene ring portion, it may be fused either at positions 5 and 6 or at positions 4 and 5, or 6 and 7 upon the benzene ring portion to produce the corresponding naphthothiazoles. The benzene ring fused to the benzene ring portion can be either unsubstituted or substituted with, for example, halogens.

With reference to Formula I, preferred R substituents on the benzene ring portion and preferred limitations therefor, are: —H, with the proviso that when $X_2$ is $Cl_3$, at least one R is other than hydrogen; —Cl, —Br, and —F, with a maximum of three —F atoms, three —Br atoms and four —Cl atoms; —$NO_2$ with a maximum of two, with the proviso that when $X_3$ is $Cl_3$ at least one R is other than —$NO_2$; trihalomethyl wherein trihalomethyl is $Cl_3C$—, $F_3C$—, and $Br_3C$—, with a maximum of one; alkyl of from one to twelve carbon atoms, with a maximum of three alkyl groups; alkenyl of from two to twelve carbon atoms, with a maximum of two alkenyl groups; alkoxy, aryloxy and their sulfur analogs, alkylthio, and arylthio, with a total carbon content of from one to eight carbon atoms for the alkyl moiety and from 6 to 12 for the aryl moiety, and a maximum of any two of such groups; —CN, —COOH, and —$CONH_2$, with a maximum of two of these groups; —$NH_2$, with a maximum of two;

acylamido 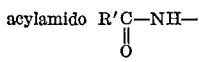

wherein R' is alkyl of from one to eight carbon atoms, with a maximum of two;

aroylamido 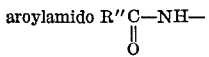

wherein R" is aryl with a total carbon content of from 6 to 12 carbon atoms, with a maximum of two;

acyloxy 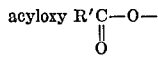

wherein R' is alkyl of from one to eight carbon atoms, with a maximum of two;

aroyloxy 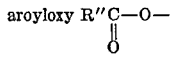

wherein R" is aryl with a total carbon content of from 6 to 12 carbon atoms, with a maximum of two;

alkoxycarbonyl 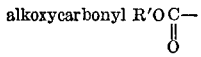

wherein R' is alkyl of from one to eight carbon atoms, with a maximum of two;

aryloxyctrbonyl 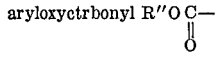

wherein R" is aryl with a total carbon content of from 6 to 12 carbon atoms, with a maximum of two;

alkythiocarbonyl 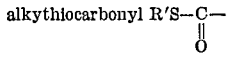

wherein R' is alkyl of from one to eight carbon atoms with a maximum of two;

arylthiocarbonyl 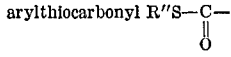

wherein R" is aryl with a total carbon content of from 6 to 12 carbon atoms, with a maximum of two;

alkoxysulfinyl 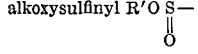

wherein R' is alkyl of from one to eight carbon atoms, with a maximum of two;

aryloxysulfinyl 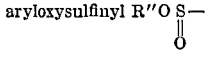

wherein R" is aryl with a total carbon content of 6 to 12 carbon atoms, with a maximum of two;

alkylsulfonyl 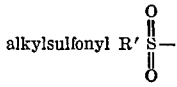

wherein R' is alkyl of from one to eight carbon atoms, with a maximum of two;

arylsulfonyl 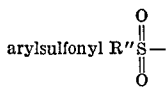

wherein R" is aryl with a total of 6 to 12 carbon atoms, with a maximum of two;

acyl 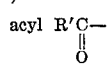

wherein R' is hydrogen or alkyl of from one to eight carbon atoms, with a maximum of two; sulfo ($HO_3S-$), with a maximum of two; sulfamyl ($H_2NO_2S-$), with a maximum of two;

aroyl 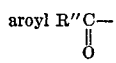

wherein R" is aryl with a total carbon content of from 6 to 12 carbon atoms, with a maximum of two; and one fused benzene ring, substituted or unsubstituted, fused to the benzene portion of the benzothiazole moiety referred to herein above.

The preferred 2-trihalomethylbenzothiazoles of this invention are the 2-trichloromethylbenzothiazoles, 2-tribromomethylbenzothiazoles and mixed 2-chloro- and bromomethylbenzothiazoles which can be represented by Formula II:

II
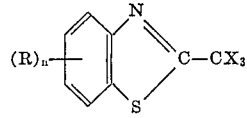

wherein R represents any of the preferred R substituents on the benzene ring portion shown hereinabove with reference to the R's preferred in Formula I; X is chlorine or bromine or combinations thereof; and $n$ is an integer of from 0 to 4, inclusive, with the proviso that at least one R is other than hydrogen or nitro when $X_3$ is $Cl_3$.

Particularly preferred novel 2-trihalomethylbenzothiazoles are those represented by Formulae III, IV, and IV-a):

III 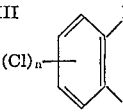 IV 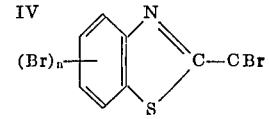

IV-a
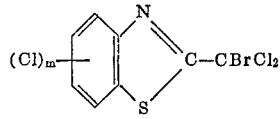

wherein $n$ is Formula III, and IV is a value of from 1 to 4, inclusive and IV–a wherein $m$ is a value of from 0 to 4.

The 2-trihalomethylbenzothiazoles of this invention can be prepared by the two novel methods disclosed hereinafter.

The first method involves the mild halogenation of a 2-dihalomethylbenzothiazole to the corresponding 2-trihalomethylbenzothiazole. This method can be illustrated by reaction scheme (A):

(A)
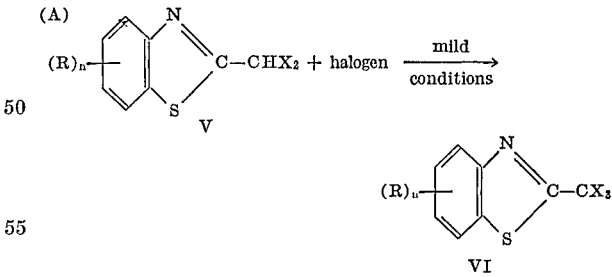

wherein R, X and $n$ are as hereinabove defined, with the restriction that this method of preparation is not applicable where R is alkenyl, hydroxy, mercapto, alkylthio, arylthio, carbamoyl, thiocarbamoyl, N-alkylcarbamoyl, N-arylcarbamoyl, acylamido, amino, alkylamino, arylamino, alkylthiocarbonyl, arylthiocarbonyl, alkoxysulfinyl, aryloxysulfinyl, and sulfamyl. All of these groups are sensitive to oxidants (such as halogen), and hence this method is not applicable when R is as noted above.

In reaction scheme (A), a 2-dihalomethylbenzothiazole (V) is halogenated with liquid halogen in the presence of an inert solvent to the corresponding 2-trihalomethylbenzothiazole (VI). Following are the mild halogenating conditions employed in the process illustrated by reaction scheme (A). The reaction can be conducted either batchwise or in a continuous manner. The reactor can be any reactor made up of materials resistant to hydrogen halides and halogens. The halogens which work best in the halogenation reaction are chlorine or bromine. The mole ratio of reactants, halogen to 2-dihalomethylbenzothiazole, is preferably 1.2 to 1, with 0.1 to 1 to 10 to 1 being operative. The reaction can be conducted in the presence of a catalyst such as metallic iron, ferric chloride or ferric bromide, but a catalyst is not essential to the reaction and the reaction is in no way restricted to the presence of a catalyst. The reaction is conducted in the presence of an inert solvent and any inert solvent is suitable. Especially preferred inert solvents are the highly chlorinated aliphatic hydrocarbons and chlorinated aromatic hydrocarbons. The temperature of the reaction can vary from about 0 to 100° C., with from about 25 to 70° C. preferred, and from about 30 to 60° C. most preferred. The amount of time required for the reaction can vary from about 0.2 to 10 hours, with from about 0.5 to 7 hours preferred, and from about 1 to 5 hours most preferred.

The first method of this invention can be more specifically illustrated with the synthesis of 2-trichloromethylbenzothiazole (VIII) from 2-dichloromethylbenzothiazole (VII) as shown in reaction scheme (B), employing the aforementioned mild reaction conditions.

(B)

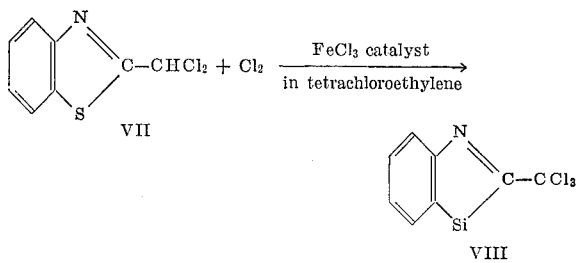

The second method of this invention involves the permanganate oxidation of 2-trichloromethylbenzothiazolines to their corresponding 2-trichloromethylbenzothiazoles. This second method can be illustrated by reaction scheme (C):

(C)

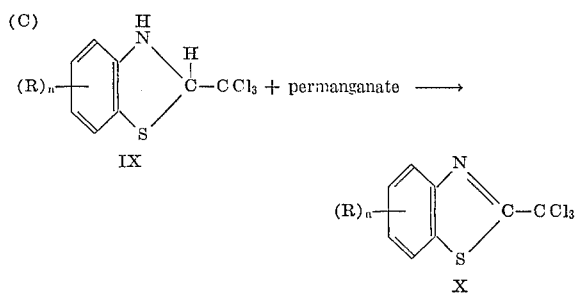

wherein R and $n$ are as defined hereinabove, with the restriction that this method of preparation is not applicable where R is alkenyl, hydroxy, mercapto, alkylthio, arylthio, thiocarbamyl, amino, alkylamino, arylamino, alkylthiocarbonyl, arylthiocarbonyl, alkoxysulfinyl, and aryloxysulfinyl. Again, these groups are sensitive to oxidants although potassium permanganate at 0 to 5° C. is more mild than halogen (under conditions of scheme (A)) and hence this list is not as restrictive as when mild halogenation is employed.

In reaction scheme (C), a 2-trichloromethylbenzothiazoline (IX) is oxidized with a permanganate to the corresponding 2-trichloromethylbenzothiazole (X). The type of reactor is not critical but one constructed of hydrogen chloride-resistant materials is preferred. The reaction can be conducted in the presence of any inert solvent. Of the solvents suitable, aqueous acetone is preferred. Other suitable solvents include non-aqueous acetone, methylethyl ketone, acetic acid, dioxane, and tetrahydrofuran, or combinations of these solvents with varying amounts of water. When present the amount of water should not exceed above about 40% by weight, and can range from about 10% to about 40%. The pressure at which the reaction is conducted is not critical, with atmospheric pressure preferred. The mole ratio of reactants, 2-trichloromethylbenzothiazoline to permanganate, is most preferably 1.5 to 1, with 1.2 to 1 to 2.0 to 1 preferred, and 1.0 to 1 to 5.0 to 1 operative. The reaction can be conducted in the absence or presence of strong acids, with the presence of certain strong acids being preferred. Suitable strong acids include phosphoric acid, sulfuric acid, and the arylsulfonic acids such as benzenesulfonic acid and naphthalenesulfonic acid. The presence of phosphoric acid, in an amount equimolar to that of the permanganate is most preferred. The permanganate oxidant can be any alkali metal or alkaline earth metal permanganate, with potassium, sodium or calcium permanganate preferred. It has been found that conventional oxidants for benzothiazolines such as ferric chloride, air, and so forth will not work. The temperature of the permanganate oxidation reaction can vary from about $-50°$ C. to about $+30°$ C., with a preferred range of from about $-25°$ C. to about $+20°$ C. The most preferred temperature range is from about $-10°$ C. to about $+15°$ C. The permanganate oxidation reaction is almost instantaneous at ice-bath temperatures (0 to 5° C.), and about a 5 to 10 minute reaction period is convenient for batch operation. The operation can be capable of continuous operation by feeding, concurrently, streams of a precooled 2-trichloromethylbenzothiazoline solution and permanganate solution into a holding zone.

The second method of this invention can be specifically illustrated with the synthesis of 2-trichloromethylbenzothiazoles (XI) from the corresponding 2-trichloromethylbenzothiazolines (XII) in the presence of phosphoric acid using potassium permanganate as the permanganate oxidant as shown in reaction scheme (D), employing the aforementioned conditions.

(D)

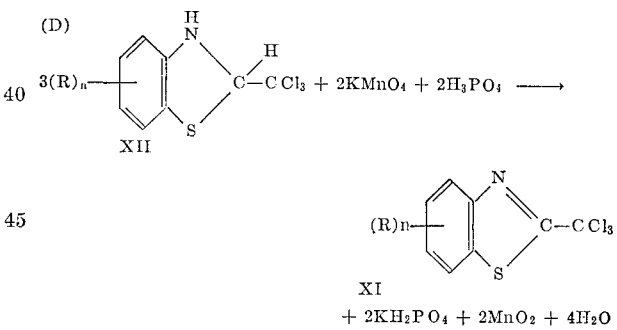

wherein R and $n$ are as defined hereinabove with R having the restrictions enumerated following reaction scheme (C).

The following examples illustrate the 2-trihalomethylbenzothiazoles of this invention and their preparation:

EXAMPLE 1

2-trichloromethylbenzothiazole

To a cold (approx. 4° C.) agitated solution of 25.5 g. (0.1 mole) of 2-trichloromethylbenzothiazoline, 7.7 g. (0.067 mole) of 86% phosphoric acid, and 30 ml. of water in 800 ml. of acetone was added a solution of 10.6 g. (0.067 mole) of potassium permanganate in a mixture of 800 ml. of acetone and 250 ml. of water over a 10-minute period while maintaining the temperature at 4 to 15° C. by external cooling. Reaction was instantaneous and the by-product manganese dioxide was suction filtered from the reaction mixture with the aid of Hyflo.

Evaporation of acetone from the filtrate left a mixture of water and a dark syrup which, after decanting the water was extracted repeatedly with ethyl ether. The ether solution was filtered, dried over sodium sulfate, treated with decolorizing carbon and again filtered after which the ether was removed by evaporation. The resulting brown syrup was combined with a similar material obtained by ether extraction of the decanted water layer and the organic product dried in a vacuum oven. The crude product (18.0 g.) was distilled through a simple system to give 9.3 g. (37.1% crude yield) of 2-trichloromethylbenzothiazole as a pale yellow oil, B.P. 117 to 128° C./1 to 3 mm., contaminated by an unknown second liquid phase. The material was purified by crystallizing from pentane at −60 to −70° C. and pressing the collected white crystals out on absorbent paper. The yield of pure material was 6.2 g. melting at 31.5 to 34.0° C.

*Analysis.*—Calc'd. for $C_8H_4NSCl_3$ (percent): N, 5.55. Found (percent): N, 5.73.

Infrared analysis confirmed the identity of the product.

EXAMPLE 2

2-trichloromethylbenzothiazole

A 76.5 g. (0.3 mole) charge of 2-trichloromethylbenzothiazoline in 2400 ml. of acetone solution containing 22.8 g. (0.2 mole) of 86% phosphoric acid and 90 ml. of water was oxidized with a solution of 31.8 g. (0.2 mole) of potassium permanganate in a mixture of 2400 ml. of acetone and 750 ml. of water employing the reaction conditions of Example 1. Evaporation of the filtered reaction mixture gave a syrup which was extracted with pentane. The pentane solution was filtered, evaporated to about 200 ml. in volume and cooled to about −80° C. causing crystallization of 44.6 g. of 2-trichloromethylbenzothiazole, M.P. 32.5 to 33.5° C. A second crop, weight 1.2 g., M.P. 30 to 33° C. brought the total yield to 60.3%.

EXAMPLE 3

2-trichloromethylbenzothiazole

To a stirred solution of 43.7 g. (0.2 mole) of 2-dichloromethylbenzothiazole in 100 ml. of tetrachloroethylene containing 0.2 g. of anhydrous ferric chloride and 0.1 g. or iron filings was added 17.7 g. (0.25 mole, 11 ml. at −75° C.) of liquid chlorine over a 5-minute period at 17 to 22° C. Upon completing the feed, a mild exothermic reaction occurred, bringing the temperature to 29° C. over the next 51 minutes during which time a small amount of precipitate formed and refluxing chlorine was returned to the mixture by a dry ice-acetone condenser. The mixture was then warmed to 40° C. where it was held for one hour at which time evolution of hydrogen chloride had ceased.

The reaction mixture was filtered and evaporated under reduced pressure to give 48.9 g. of dark syrup. IR analysis of the latter showed it to be 2-trichloromethylbenzothiazole. It was purified by crystallizing from 300 ml. of pentane (darko treating and filtering) at −80° C. The resulting white crystalline 2-trichloromethylbenzothiazole, M.P. 35.5 to 36° C., weighed 42.8 g. (84.8% yield). The M.P. was undepressed upon admixture with authentic material.

*Analysis.*—Calc'd. for $C_8H_4NSCl_3$ (percent): N, 5.55. Found (percent): N, 5.68.

EXAMPLE 4

5-chloro-2-trichloromethylbenzothiazole

To a stirred solution of 36.1 g. (0.125 mole) of 5-chloro-2-trichloromethylbenzothiazoline in 1200 ml. of acetone was added, at 5° C., 9.5 g. of 86% phosphoric acid (0.083 mole) diluted with about 40 ml. of water followed by a cold (5° C.) solution of 13.2 g. (0.083 mole) of potassium permanganate in a mixture of 1000 ml. of acetone and 311 ml. of water, fed over a 10-minute period. Upon completion of the feed, the reaction mixture was immediately filtered to remove manganese dioxide and the filtrate evaporated overnight in the air.

The partially evaporated filtrate was stirred with ca. 1000 ml. of pentane which dissolved a solid which had separated. The pentane extract was concentrated to ca. 100 ml. and chilled to −80° C. causing crystallization of 13.9 g. (38.7% yield) of 5-chloro-2-trichloromethylbenzothiazole, M.P. 99 to 100° C.

*Analysis.*—Calc'd. for $C_8H_3NSCl_4$ (percent): C, 33.48; H, 1.05; Cl, 49.42. Found (percent): C, 33.98; H, 1.33; Cl, 49.12.

Infrared analysis confirmed the assigned structure.

EXAMPLE 5

2-bromodichloromethylbenzothiazole

To a stirred mixture of 43.6 g. (0.2 mole) of 2-dichloromethylbenzothiazole, 0.3 g. of anhydrous ferric bromide, 0.1 g. of iron powder and 200 ml. of tetrachloroethylene was added 38.4 g. (0.24 mole) of bromine over a 5-minute period, the initial temperature of 21° C. showing no response to the addition. A gummy material formed on the walls of the flask and the mixture was warmed to 45 to 50° C. at which point it was stirred for 4 hours. By-product hydrogen bromide was partially removed from the mixture by passing nitrogen through it for 1.25 hours.

The liquid layer was decanted away from a brown solid which, after washing with pentane and vacuum drying, weighed 36.5 g. It underwent slow decomposition upon standing and resisted all efforts at recrystallization or other means of purification. The supernatant liquid was charcoal-treated, filtered and evaporated under reduced pressure to give 27.4 g. of a light yellow liquid. Upon solution in 150 ml. of pentane and chilling to about −80° C., a white, crystalline material, weight 22.2 g., M.P. 33 to 35.5° C., was obtained. NMR analysis suggested a mixture containing about 76% of the desired product along with 24% of starting 2-dichloromethylbenzothiazole, an estimate born out by the following carbon analysis:

*Analysis.*—Calc'd. for 76% $C_8H_4NSBrCl_2$+24% $C_8H_5NSCl_2$ (percent): C, 35.15; H, 1.58. Found (percent): C, 34.91; H, 2.60.

Infrared analysis gave a spectrum consistent with 2-bromodichloromethylbenzothiazole containing minor impurities. After several attempts at low temperature crystallization of pure product from pentane had failed, an 11.0 g. intermediate fraction, M.P. 33 to 42.5° C., was dissolved in 40 ml. of warm pentane and allowed to stand for 3 days at room temperature. Pure 2-bromodichloromethylbenzothiazole, M.P. 48.5 to 49° C., separated as large equant prisms weighing 3.5 g. (5.9% of theory).

*Analysis.*—Calc'd. for $C_8H_4NSBrCl_2$ (percent): C, 32.35; H, 1.36; Br, 26.91. Found (percent): C, 32.10; H, 1.40; Br, 26.03.

Infrared analysis gave a spectrum which was in agreement with the expected structure and was almost identical to that of 2-trichloromethylbenzothiazole. The main bands were at 3.25 $\mu$ (aromatic C–H), 6.42 and 6.7$\mu$ (aromatic C=C), 12.25 and 12.37$\mu$ (CBrCl$_2$), 13.18$\mu$ (1,2-disubs. aromatic), 13.76$\mu$, 13.89$\mu$, and 14.15$\mu$. The NMR spectrum showed a complex multiplet with signals from 7.3 to 8.25 p.p.m. There was no 1 H signal at 7.1 to 7.2 p.p.m. and hence, no evidence of hydrogen remaining on the 2-methyl group. The UV spectrum showed maxima at 217 mu ($\epsilon$=15,454), 241 mu ($\epsilon$=6237) and 276 mu ($\epsilon$=8818). When the filtrate from the above was chilled to −80° C., 5.5 g. of white crystals, M.P. 31 to 34° C., were obtained. Analysis of this crop indicated a possible mixture containing 77.2% of the product and starting material.

*Analysis.*—Calc'd. for 77.2% $C_8H_4NSBrCl_2$+22.8% $C_8H_5NSCl_2$ (percent): C, 35.01; H, 1.58; Br, 20.75. Found (percent): C, 34.99; H, 2.63; Br, 20.75.

The infrared spectrum of this material was virtually identical to that of the pure bromodichloro compound showing only minor impurity bands.

Assuming that the initially-obtained mixture (22.2 g.) contains only 2-bromodichloromethylbenzothiazole and starting material, as indicated by NMR analysis, the total yield of product is calculated to be 28.4% with a recovery of 12.2% of unreacted 2-dichloromethylbenzothiazole.

EXAMPLE 6

5(or 6)bromo-2-tribromomethylbenzothiazole

A cooled (approx. 15 to 22° C.) mixture of 14.9 g. (0.1 mole) of 2-methylbenzothiazole, 80 g. (0.5 mole) of bromine, 30 g. of anhydrous sodium acetate and 250 ml. of glacial acetic acid was heated, with stirring, to 90 to 92° C. where it was held for a 4-hour period. The reaction mixture was diluted with an ether-pentane mixture and the ether-pentane layer water-washed, dried over sodium sulfate, filtered and evaporated to give 34.6 g. of a brown solid. Extraction of this with boiling pentane gave, upon evaporation, 6.6 g. of crude product, M.P. 83.5 to 85° C. This was recrystallized from hexane and then from ethyl acetate to give 3.0 grams (6.4% yield) of 5(or 6) bromo - 2 - tribromomethylbenzothiazole, M.P. 111.5 to 112.5 C.

*Analysis.*—Calc'd. for $C_8H_3NSBr_4$ (percent): C, 20.67; H, 0.65; Br, 68.77. Found (percent): C, 20.32; H, 0.64; Br, 69.23.

Both infrared and NMR spectral analysis were in agreement with the assigned structure.

Other representative 2-trihalomethylbenzothiazoles which can be prepared in a similar manner to that shown in the foregoing examples are:
2-trichloromethylbenzothiazole,
6-nitro-2-trichloromethylbenzothiazole,
5-chloro-2-trichloromethylbenzothiazole,
2-bromodichloromethylbenzothiazole,
5-bromo-2-tribromomethylbenzothiazole,
6-bromo-2-tribromomethylbenzothiazole,
2-trichloromethyl-5-methoxybenzothiazole,
2-trichloromethyl-6-methoxybenzothiazole,
6-chloro-2-trichloromethylbenzothiazole,
2-trichloromethyl-α-naphthothiazole,
2-trichloromethyl-β-naphthothiazole,
2-trichloromethyl-7-chloro-β-naphthothiazole,
2-trichloromethyl-8-chloro-β-naphthothiazole,
2-tribromomethylbenzothiazole,
2-difluorochloromethylbenzothiazole,
6-propyl-2-trichloromethylbenzothiazole,
2-bromodichloromethyl-6-nitrobenzothiazole,
2-trichloromethyl-5-trifluoromethylbenzothiazole,
2-bromodichloromethyl-5-trifluoromethylbenzothiazole,
2-trichloromethyl-5-nitrobenzothiazole,
4-chloro-2-trichloromethylbenzothiazole,
7-chloro-2-trichloromethylbenzothiazole,
5,7-dichloro-2-trichloromethylbenzothiazole,
4,6-dichloro-2-trichloromethylbenzothiazole,
2-trichloromethyl-5-methylbenzothiazole,
2-trichloromethyl-6-n-butylbenzothiazole,
6-chloro-2-trichloromethyl-5-methylbenzothiazole,
4,6-dichloro-2-trichloromethyl-5-ethylbenzothiazole,
4-chloro-2-trichloromethyl-6-nitrobenzothiazole,
5-acetamido-2-tribromomethylbenzothiazole,
6-acetyl-2-tribromomethylbenzothiazole,
5-chloro-2-tribromomethylbenzothiazole,
2-tribromomethyl-6-nitrobenzothiazole,
2-tribromomethyl-6-methoxybenzothiazole,
4-chloro-2-tribromomethyl-6-phenylbenzothiazole,
2-trifluoromethylbenzothiazole,
6-cyano-2-trifluoromethylbenzothiazole,
5-bromo-7-trifluoromethylbenzothiazole,
6-amino-5-(2-butenyl)-2-trifluoromethylbenzothiazole,
2-trifluoromethyl-5-phenylthiocarbonylbenzothiazole,
2-trifluoromethyl-4-ethyl-6-n-propoxycarbonylbenzothiazole,
2-dibromochloromethylbenzothiazole,
2-dibromofluoromethylbenzothiazole,
2-difluorobromomethylbenzothiazole,
5-chloro-2-difluorochloromethylbenzothiazole,
2-difluorobromomethyl-6-nitrobenzothiazole,
and 6-chloro-2-dibromofluoromethylbenzothiazole; and the like.

The 2-trihalomethylbenzothiazoles of this invention find particular application in the agricultural field as pesticides. As a class, they display bactericidal, fungicidal, miticidal, mildewcidal and nematocidal activity.

As representative of the pesticidal activity of 2-trihalomethylbenzothiazoles, 2-trichloromethylbenzothiazole has shown very good activity as a nematocide, and bactericide; 5(6)bromo-2-tribromomethylbenzothiazole has shown promising performance as a mildewcide; 6-nitro-2-trichloromethylbenzothiazole has shown good activity as a bactericide, as a foliage fungicide, as a soil fungicide, as a nematocide, and as a mite ovicide, also this compound exhibits systemic fungicidal activity; and 2-bromodichloromethylbenzothiazole has shown very good activity as a soil fungicide, adult miticide and as a suckering agent, with a good showing as a nematocide.

The following is a description of the general test method employed in demonstrating the nematocidal activity of the 2-trihalomethylbenzothiazoles of this invention. In particular, the following demonstrates the nematocidal acitivity of the 2-trichloromethylbenzothiazole, 2-bromodichloromethylbenzothiazole and 6-nitro-2-trichloromethylbenzothiazole, and the results which were obtained with these three representative compounds.

Infective migratory larvae of the root-knot nematode, *Meloidogyne incognita* var. acrita, reared in the greenhouse on roots of tomato plants (var. Rutgers), constituted the test organism. This particular nematode incites distinct galls or knots on the roots of certain plants. Infected tomato plants were removed from the stock culture, and these roots were very finely chopped. Standard amounts of this root inoculum were added to a series of pint mason jars, each containing 180 cc. of soil. The jars were capped and incubated for one week at room temperature during which period the nematode eggs hatched and the larval forms migrated into the soil.

A standard formulation of each 2-trihalomethylbenzothiazole was prepared by weighing 100 mg. of the compound into 10 ml. of acetone containing a constant emulsifier. These formulations were further diluted with water to produce 10-ml. volumes containing 10 mg., 2.5 mg., and 0.6 mg. of 2-trihalomethylbenzothiazole which when added to the jars of soil were approximately equal to rates of 75, 19, and 5 pounds of test compound per acre, respectively. Twenty-five ml. of the test formulation was added to each of two jars for each dosage. Following addition of formulation, the jars were tightly capped, and the contents were thoroughly mixed on a ball mill for five minutes. The jars remained capped for 48 hours after which the contents were transferred to three-inch diameter clay pots. The soil was then planted with cucumber seeds; and since cucumber is susceptable to root-knot nematode attack, it served as an indicator crop. The pots were then placed in a greenhouse.

After three weeks, the cucumber plants were removed from the pots, the roots were washed free of adhering soil, and directly compared with the roots of similar plants grown in infested but untreated soil. The averaged degree of gall formation on the roots of the cucumber plants was the basis for ascertaining nematode control. The "effective dose" (ED) was visually rated according to the following number designations:

1=severe galling; equal to untreated plants
2=moderate galling
3=light galling
4=very light galling
5=no galling; complete control $ED_3$ values or an effective dose required for a 3 rating was obtained by plotting log concentration of benzothiazole versus probit rating and deriving the concentration of chemical, in pounds per acre, required for 50% control of the root-knot nematode.

The results of these tests, demonstrating the effectiveness of the 2-trihalomethylbenzothiazoles, are presented in Table I.

TABLE I
TOXICITY OF 2-TRIHALOBENZOTHIAZOLES TO ROOT-KNOT NEMATODE

| Test Compound: | Pounds per acre required for $ED_3$ root-knot rating |
|---|---|
| 2 - trichloromethylbenzothiazole | 7 |
| 2 - bromodichloromethylbenzothiazole | 19 |
| 6 - nitro-2-trichloromethylbenzothiazole | 8 |

The bactericidal activity of the 2-trihalomethylbenzothiazoles, represented by 2-trichloromethylbenzothiazole, 5(6)bromo - 2-trichloromethylbenzothiazole and 6-nitro-2-trichloromethylbenzothiazole, was determined as follows:

The test organism, *Staphylococcus aureus,* was cultured on Difco nutrient agar media (pH 7.0) at 20° C. To 50-ml. Erlenmeyer flasks containing 18 ml. of sterile melted nutrient agar was added 2 ml. of a standardly prepared test solution of the 2-trihalomethylbenzothiazole was 100 parts per million parts of media. Each flask was agitated well to insure thorough and uniform mixing of the 2-trihalomethylbenzothiazole and the media and the mixture was then immediately poured into sterile petri dishes. When the agar had solidified, it was inoculated with the test bacteria by gently rubbing the surface of the bacterial colony with a sterile transfer loop and streaking the surface of the agar fortified with the 2-trihalomethylbenzothiazole by starting at the center of the petri dish and working toward the edge. The dish was incubated at 20° C. for 48 hours. The ability of the 2-trihalomethylbenzothiazole to inhibit growth of bacteria was visually rated according to the following designations:

5=no growth
3=moderate growth
1=severe, equal to or more growth than agar not fortified with 2-trihalomethylbenzothiazole The 2-trichloromethylbenzothiazole, 5(6)bromo-2-tribromomethylbenzothiazole and 6-nitro-2 - trichloromethylbenzothiazole were rated "5" indicating complete suppression of bacterial colonial growth.

The soil fungicidal activity of the 2-trihalomethylbenzothiazoles, represented by 2-bromodichloromethylbenzothiazole and 6 - nitro-2 - trichloromethylbenzothiazole, was determined as follows:

The plant pathogenic soil-born fungi *Rhizoctonia solani* and *Fusarium oxysporum* f. *lycopersici* were cultured on standard corn meal-sand media.

Sterile Norfolk sand loam soil was inoculated by thoroughly mixing by hand two pint mason jars of corn meal-sand media infected with *Rhizoctonia solani* with approximately 13,500 cubic centimeters of soil. The infected soil was then dispensed into paper cups. A 20 ml. volume of the standardly prepared 2-trihalomethylbenzothiazole was drenched on to each of 2 paper cups containing the infested soils. The 2-trihalomethylbenzothiazoles were applied at the rate of 50 pounds per acre of soil. The treated cups were incubated for 2 days at 70° F. and 96 percent of relative humidity.

Following the incubation period the amount of surface mycelial growth was visually rated according to the following designations:

5=no growth
4=one or two colonies
3=surface one-half covered with colonies
2=surface three-fourths covered with colonies
1=growth equal to check Similar tests were conducted employing *Fusarium oxysporum* f. *lycopersici* as the test organism.

The 2-bromodichloromethylbenzothiazole received a rating of "5" which indicates complete control of Rhizoctonia and Fusarium while the 6-nitro-2-trichloromethylbenzothiazole received ratings of "5" and "1" for control of Rhizoctonia and Fusarium, respectively.

The mildewcidal activity of the 2-trihalomethylbenzothiazoles, represented by 5(6)bromo-2-tribromomethylbenzothiazole, was determined in the following manner:

Young potted Tendergreen bean plants with primary leaves fully expanded were inoculated with bean mildew, *Erysiphe polygoni.* Twenty-four hours later the plants were placed on a revolving turntable and approximately 100 ml. of the standardly prepared formulation of 5(6) bromo-2-tribromomethylbenzothiazole was applied with a DeVilbiss spray gun, with air pressure set at 40 pounds. This volume of spray was sufficient to wet plants to runoff. Similar applications to other infected plants were made with a water solution containing acetone and emulsifier in the same concentration as the 2-trihalomethylbenzothiazole mixture but without the candidate mildewcide. These plants were employed as untreated controls. The trihalomethylbenzothiazole was formulated by a standard procedure of solution in acetone, addition of an emulsifier and dilution with water. The concentrations of the 2-trihalomethylbenzothiazole which were applied to the infected plants were 100, 20, and 4 parts per million parts of water. The test plants were held at 68° F. and 60 percent relative humidity for a period of 5 to 7 days until symptoms of disease developed on the untreated controls. The degree of infection on primary leaves was then visually rated according to the following designations:

5=no mildew
4=lightly infected
3=moderately infected
1=severely infected, equal to untreated control plants The results obtained follow in Table II.

TABLE II

| Treatment | Bean mildew control rating [1] concentration, p.p.m. | | |
|---|---|---|---|
| | 100 | 20 | 4 |
| 5(6)-bromo-2-tribomomethylbenzothiazole | 5 | 3 | 1 |

[1] Untreated controls received a rating of "1."

The efficacy of a 2-trihalomethylbenzothiazole to protest plants from foliage disease infection was demonstrated in two distinct and separate methods of application using 6 - nitro - 2 - trichloromethylbenzothiazole as toxicant.

METHOD I
Application to aerial parts of the plant

The 6-nitro-2-trichloromethylbenzothiazole was sprayed on cucumber plants 2 to 4 weeks of age growing in 2½ inch pots. The preparation of the spray mixtures and the method of application to the plants were identical to those which have been described for the mildewcidal determinations.

METHOD II
Application to soil in which plants are growing (i.e. systemic application)

Aqueous dispersions of the standardly prepared 6-nitro-2 - trichloromethylbenzothiazole were poured into 2½ inch pots containing two cucumber plants 2 to 4 weeks of age. The test concentrations of the 2-trihalomethylbenzothiazole which were employed in systemic applications were 250 p.p.m., 50 p.p.m., and 10 p.p.m. Approximately 30 ml. of solution was poured into each pot.

The pathogen *Collectotrichum lagenarium*, the etiological agent of cucumber anthracnose, was cultured on freshly prepared lima bean agar. An aqueous suspension containing 200,000–500,000 viable spores of this organism was employed as inoculum. Two hours after application of the 6-nitro-2-trichloromethylbenzothiazole to the potted cucumber plants they were inoculated by placing them on the turntable and spraying with the spore suspension of the pathogen for 30 seconds. Untreated control plants were similarly inoculated.

Following inoculation, the plants were incubated for 24 hours at 70° F. and 100 percent relative humidity. The plants were then removed from the incubation chamber and held at 80° F. and 50 percent relative humidity. One week after inoculation symptoms of disease developed. Counts were made of the total number of lesions found on the leaves of each plant, treated and untreated. The percent control was calculated and the results were recorded according to the following designations:

|   | Percent control |
|---|---|
| 5 | 90–100 |
| 4 | 70–89 |
| 3 | 50–69 |
| 2 | 25–49 |
| 1 | 0–24 |

The degree of control which was obtained with the 6-nitro - 2 - trichloromethylbenzothiazole is presented in Table III:

TABLE III

CUCUMBER ANTHRACNOSE CONTROL RATINGS FOR VARIOUS CONCENTRATIONS OF 6-NITRO-2-TRICHLOROMETHYLBENZOTHIAZOLE

Spray applications (p.p.m.):
   100 _____ 4
   20 _____ 2
   4 _____ 1

Systemic applications (p.p.m.):
   250 _____ 4
   50 _____ 1
   10 _____ 1

The miticidal activity of the 2 - trihalomethylbenzothiazoles, represented by 2 - bromodichloromethylbenzothiazole and 6-nitro-2-trichloromethylbenzothiazole, was demonstrated in the following manner:

Adults, nymphs and eggs of the two-spotted mite (*Tetranychus telarius* (L.)) were reared on Tendergreen beans under controlled conditions (80±5° F. and 50±5% relative humidity). Infested leaves from the stock culture were placed on the primary leaves of 2 bean plants 6 to 8 inches in height growing in a 2½ inch clay pot. A sufficient number of mites for testing (150–200) will transfer from the excised leaves to the fresh plants in a period of 24 hours. During this period the females will oviposit several hundred eggs. Following the transfer period the excised leaves are removed from the infested plants.

The 2-trihalomethylbenzothiazoles were formulated according to the procedures which have been described previously. One pot of infested plants was placed on the turntable and sprayed with each dosage of the candidate miticide. Application to other infested plants were made with a water solution containing acetone and emulsifier in the same concentration as the 2-trihalomethylbenzothiazoles but without the candidate miticide.

Following the spray application the plants were held at 80±5° F. and 50±5% relative humidity for seven days. At this time a microscopic examination was made and the number of living and dead mites on each plant was recorded. The percent control was calculated from these figures. The $LD_{50}$ values, or effective doses required to kill 50% of the organisms, were derived for each of the 2-trihalomethylbenzothiazoles. These data are presented in Table IV:

TABLE IV.—TOXICITY OF 2-TRIHALOMETHYLBENZO-THIAZOLES TO THE TWO-SPOTTED MITE

| | $LD_{50}$ in p.p.m. | |
|---|---|---|
| Test compound | Adults and nymphs | Eggs |
| 2-bromodichloromethylbenzothiazole | 325 | (¹) |
| 6-nitro-2-trichloromethylbenzothiazole | (¹) | 500 |

¹ Ineffective at 1,000 p.p.m.

The 2-trihalobenzothiazoles contemplated in this invention may be applied as miticides, fungicides, bactericides, and mildewcides, and nematocides according to methods known to those skilled in the art. Pesticidal compositions containing the benzothiazoles as the active toxicant will usually comprise a carrier or diluent, either liquid or solid.

Suitable liquid diluents or carriers include water, petroleum distillates, or other liquid carriers with or without surface active agents. Liquid concentrates may be prepared by dissolving one of these compounds with a non-phytotoxic solvent as acetone, xylene, or nitrobenzene and dispersing the toxicants in water with the aid of suitable surface active dispersing agents.

The choice of dispersing and emulsifying agent and the amount employed is dictated by the nature of the composition and the ability of the agent to facilitate the dispersion of the toxicant. Generally, it is desirable to use as little of the agent as is possible, consistent with the desired dispersion of the toxicant in the spray so that rain does not re-emulsify the toxicant after it is applied to the plant and wash it off the plant. Nonionic, anionic, or cationic dispersing and emulsifying agents may be employed, for example, the condensation products of alkylene oxides with phenol and organic acids, alkyl aryl sulfonates, complex ether alcohols, quaternary ammonium compounds, and the like.

In the preparation of wettable powder or dust or granulated compositions, the active ingredient is dispersed in and on an appropriately divided solid carrier such as clay, talc, bentonite, diatomaceous earth, fuller's earth, and the like. In the formulation of the wettable powders the aforementioned dispersing agents as well as ligno-sulfonates can be included.

The required amount of the toxicants contemplated herein may be applied per acre treated in from 1 to 200 gallons or more of liquid carrier diluent or in from about 5 to 500 pounds of inert solid carrier or diluent. The concentration in the liquid concentrate will usually vary from about 10 to 95 percent by weight and in the solid formulations from about 0.5 to about 90 percent by weight. Satisfactory sprays, dusts, or granules for general use contain from about ¼ to 15 pounds of active toxicant per acre.

A preferred aspect of this invention is the particular use of 2-trihalomethylbenzothiazoles as pesticides, that is, the method of using 2-trihalomethylbenzothiazoles to combat pests which adversely affect crops. The method of using 2 - trihalomethylbenzothiazoles as pesticides, encompasses both novel and known 2-trihalomethylbenzothiazoles disclosed herein. For example, the known benzothiazoles, 2-trichloromethylbenzothiazole and 6-nitro-2-trichlorobenzothiazole, not heretofore known for biological activity, have been found to be potent nematocides, along with other novel benzothiazoles disclosed herein. 2-trichloromethylbenzothiazole has been found to be a potent "non-fumigant" nematocide at 3 pounds per acre.

What is claimed is:

1. A method of combatting pests selected from the group consisting of bacteria, fungi, mites and nematodes which adversely affect plant life, which method comprises contacting the pests to be combatted with a pesticidally effective amount of a 2-trihalomethylbenzothiazole of the formula:

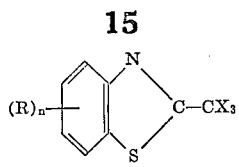

wherein R is selected from the group consisting of hydrogen, halogen, nitro, trihalomethyl and alkyl having from one to twelve carbon atoms; X is halogen, wherein the halogen molecules are the same or different; and $n$ is an integer from 0 to 4 inclusive.

2. A method of combatting nematodes which comprises contacting said nematodes with a nematocidally effective amount of 2-trichloromethylbenzothiazole.

3. A method of combatting nematodes which comprises contacting said nematodes with a nematocidally effective amount of 2-bromodichloromethylbenzothiazole.

4. A method of combatting nematodes which comprises contacting said nematodes with a nematocidally effective amount of 6 - nitro - 2 - trichloromethylbenzothiazole.

5. A method of combatting bacteria which comprises contacting said bacteria with a bactericidally effective amount of 2-trichloromethylbenzothiazole.

6. A method of combatting bacteria which comprises contacting said bacteria with a bactericidally effective amount of 5(6)-bromo-2-tribromomethylbenzothiazole.

7. A method of combatting bacteria which comprises contacting said bacteria with a bactericidally effective amount of 6-nitro-2-trichloromethylbenzothiazole.

8. A method of combatting soil fungi which comprises contacting said fungi with a fungicidally effective amount of 2-bromodichloromethylbenzothiazole.

9. A method of combatting soil fungi which comprises contacting said fungi with a fungicidally effective amount of 6-nitro-2-trichloromethylbenzothiazole.

10. A method of combatting mildew which comprises contacting mildew causing organisms with a mildewcidally effective amount of 5(6)-bromo-2-tribromomethylbenzothiazole.

11. A method of combatting foliage fungi which comprises contacting said fungi with a fungicidally effective amount of 6-nitro-2-trichloromethylbenzothiazole.

12. A method of combatting mites which comprises contacting said mites with a miticidally effective amount of 6-nitro-2-trichloromethylbenzothiazole.

13. A method of combatting mites which comprises contacting said mites with a miticidally effective amount of 2-bromodichloromethylbenzothiazole.

References Cited

FOREIGN PATENTS 812,512   4/1957   Great Britain.

OTHER REFERENCES

Mizuno et al.: Pharm. Soc. of Japan Journal, vol. 72, pp. 1263–1265 (1952).

ALBERT T. MEYERS, Primary Examiner

V. D. TURNER, Assistant Examiner

U.S. Cl. X.R.

260—304